(12) United States Patent
Salter et al.

(10) Patent No.: US 10,723,257 B2
(45) Date of Patent: Jul. 28, 2020

(54) MULTI-COLOR LUMINESCENT GRILLE FOR A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 15/896,702

(22) Filed: Feb. 14, 2018

(65) Prior Publication Data

US 2019/0248274 A1    Aug. 15, 2019

(51) Int. Cl.

| | |
|---|---|
| *B60Q 1/26* | (2006.01) |
| *F21S 43/19* | (2018.01) |
| *F21S 43/27* | (2018.01) |
| *F21S 43/20* | (2018.01) |
| *F21S 43/16* | (2018.01) |
| *F21S 43/14* | (2018.01) |
| *B60Q 1/28* | (2006.01) |
| *B60Q 1/34* | (2006.01) |
| *F21S 41/141* | (2018.01) |
| *F21S 41/20* | (2018.01) |
| *F21W 104/00* | (2018.01) |
| *F21W 103/20* | (2018.01) |

(52) U.S. Cl.
CPC ......... *B60Q 1/2661* (2013.01); *B60Q 1/2696* (2013.01); *B60Q 1/28* (2013.01); *B60Q 1/34* (2013.01); *F21S 41/141* (2018.01); *F21S 41/20* (2018.01); *F21S 43/14* (2018.01); *F21S 43/16* (2018.01); *F21S 43/19* (2018.01); *F21S 43/26* (2018.01); *F21S 43/27* (2018.01); *F21W 2103/20* (2018.01); *F21W 2104/00* (2018.01)

(58) Field of Classification Search
CPC ........ B60Q 1/2661; F21S 41/20; F21S 41/141
See application file for complete search history.

(56) References Cited

U.S. PATENT DOCUMENTS

| | | | |
|---|---|---|---|
| 2,486,859 A | 11/1949 | Meijer et al. | |
| 4,879,826 A * | 11/1989 | Wittke | B60R 13/00 40/551 |
| 5,009,020 A * | 4/1991 | Watanabe | B60Q 1/2696 362/565 |
| 5,053,930 A | 10/1991 | Benavides | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jong-Suk (James) Lee
*Assistant Examiner* — Christopher E Dunay
(74) *Attorney, Agent, or Firm* — David Coppiellie; Price Heneveld LLP

(57) ABSTRACT

A vehicle lighting assembly is provided herein. A grille has raised members pointing in a vehicle-forward direction. Light sources are disposed within each raised member and a photoluminescent structure is coupled to each raised member and is configured to luminesce in response to light excitation from one or more of the light sources.

17 Claims, 4 Drawing Sheets

(56) References Cited

U.S. PATENT DOCUMENTS

| | | |
|---|---|---|
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |
| 6,294,990 B1 | 9/2001 | Knoll et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 2002/0154379 A1* | 10/2002 | Tonar ............... B60Q 1/2665 359/267 |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0094409 A1* | 5/2005 | Elwell ............... B60Q 1/2661 362/496 |
| 2005/0189795 A1 | 9/2005 | Roessler |
| 2005/0236870 A1* | 10/2005 | Lin ............... B60Q 1/2661 296/193.1 |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0129107 A1* | 5/2009 | Egerer ............... B60R 13/02 362/509 |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0025183 A1* | 2/2011 | Su ............... H01L 25/0753 313/1 |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2013/0335997 A1* | 12/2013 | Roberts ............... G09F 21/04 362/583 |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0347871 A1* | 11/2014 | Huttenlocher ....... B60Q 1/2653 362/459 |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0138807 A1* | 5/2015 | Salter ............... B60Q 1/2661 362/510 |
| 2015/0138809 A1* | 5/2015 | Salter ............... B60R 13/005 362/510 |
| 2015/0138817 A1* | 5/2015 | Salter ............... F21S 43/13 362/510 |

(56) References Cited

U.S. PATENT DOCUMENTS

| | | |
|---|---|---|
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0195242 A1* | 7/2016 | Salter ................ B60R 19/52 362/510 |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0253179 A1 | 9/2017 | Kumada |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

MULTI-COLOR LUMINESCENT GRILLE FOR A VEHICLE

FIELD OF THE INVENTION

The present invention generally relates to vehicle grille assemblies, and more particularly, to a grille capable of multi-color illumination.

BACKGROUND OF THE INVENTION

Exterior vehicle lighting applications continue to grow in popularity. Accordingly, a vehicle grille assembly is provided herein and is operable to provide functional lighting as well as impart a stylistic element to a vehicle.

SUMMARY OF THE INVENTION

According to a first aspect of the present invention, a vehicle lighting assembly is provided. A grille has raised members pointing in a vehicle-forward direction. Light sources are disposed within each raised member and a photoluminescent structure is coupled to each raised member and is configured to luminesce in response to light excitation from one or more of the light sources.

Embodiments of the first aspect of the invention can include any one or a combination of the following features:
 each raised member forms a letter;
 the raised members are spread across a central portion of the grille, the central portion extending longitudinally across the grille;
 the central member includes a front portion injection molded from a light transmissive material and a rear portion that is insertion molded;
 each raised member houses at least one light source configured as a side emitter and disposed to emit light through a sidewall of a corresponding raised member, wherein light emitted from the at least one light source is transmitted through the sidewall to illuminate neighboring areas of the grille;
 a layer is disposed below the neighboring areas of the grille and is configured to redirect light received from the at least one light source in the vehicle-forward direction;
 a layer is disposed below the neighboring areas of the grille and is configured to luminesce in response to light excitation from the at least one light source;
 a metallized layer is disposed below the neighboring areas of the grille and is configured to impart a metallic appearance thereto;
 the photoluminescent structure is further configured to at least partially transmit light emitted from at least one of the light sources;
 a controller is configured to operate the light sources such that the raised members illuminate sequentially based on input received from one or more auxiliary turn signals; and
 the one or more auxiliary turn signals is integrated with the grille and is concealed thereby during nonuse.

According to a second aspect of the present invention, a grille is provided and includes a central portion extending longitudinally across the grille. At least one raised member is located on the central portion and points in a vehicle-forward direction. Light sources are disposed within the at least one raised member and a photoluminescent structure is coupled to the at least one raised member and is configured to luminesce in response to light excitation from one or more of the light sources.

Embodiments of the second aspect of the invention can include any one or a combination of the following features:
 the at least one raised member forms a letter;
 the light sources include at least one side emitter disposed to emit light through a sidewall of the at least one raised member, wherein light emitted from the at least one side emitter is transmitted through the sidewall to illuminate neighboring areas of the grille;
 the photoluminescent structure is further configured to at least partially transmit light emitted from at least one of the light sources; and
 operation of the light sources is based on operation of one or more auxiliary turn signals.

According to a third aspect of the present invention, a grille is provided and includes a raised member located on a portion of the grille and pointing in a vehicle-forward direction. A first light source and a second light source are disposed to backlight a forward portion of the raised member. A photoluminescent structure is coupled to the forward portion and is configured to luminesce in response to light excitation from the first light source and at least partially transmit light emitted from the second light source.

Embodiments of the third aspect of the invention can include any one or a combination of the following features:
 a side emitter is located within the raised member and is disposed to emit light toward a sidewall of the raised member; and
 the first and second light sources are operated based on operation of one or more auxiliary turn signals.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

Figure 1:
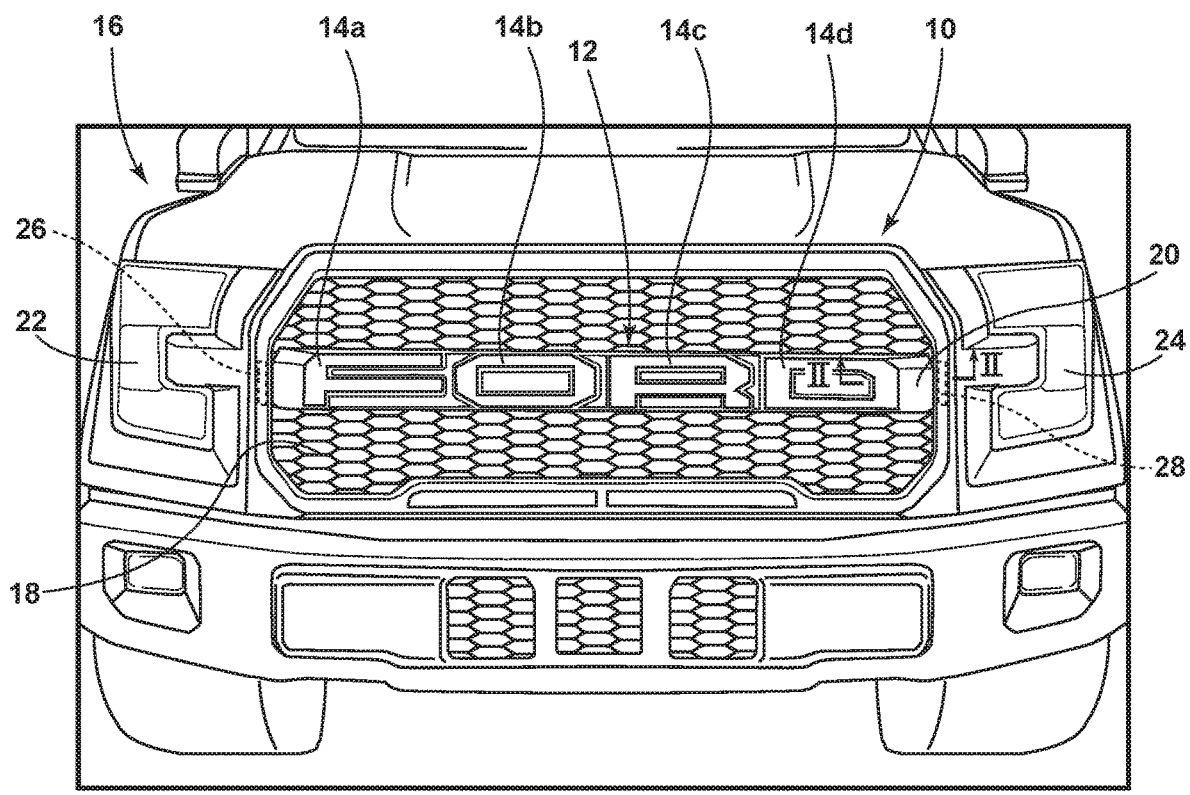
FIG. 1 is a front view of a vehicle and a vehicle lighting assembly including a grille.

Referring to FIG. 1, a vehicle lighting assembly is generally designated by reference numeral 10. The assembly 10 includes a grille 12 having at least one raised member exemplarily shown as members 14a-14d, each of which point in a vehicle-forward direction. In the present disclosure, members 14a and 14d are referred to as end members and members 14b and 14c are referred to as intermediate members disposed between end members 14a and 14d. As illustrated, the grille 12 is located in the front of a vehicle 16 and may include a plurality of grille bars 18 arranged in a lattice across the grille 12. It will be appreciated, however, that the particular pattern of the grille bars 18 is for illustrative purposes and that other patterns may be implemented if desired. The members 14a-14d are located on a central portion 20 of the grille 12 extending longitudinally between a pair of headlamps 22, 24. The central portion 20 may be variously dimensioned based on the size of the members 14a-14d and is generally shown as an elongated strip.

In the illustrated embodiment, the members 14a-14d are raised relative to the central portion 20 and each member 14a-14d forms a letter that is visible to vehicle onlookers. In other embodiments, the member(s) 14a-14d may form a symbol, logo, or any other indicia identifying the manufacturer of the vehicle 16. As will be described herein, the members 14a-14d are configured to illuminate in one or more colors based on vehicle operation. In one specific example, the members 14a-14d typically illuminate in a first color and transition to a second color based on the operation of one or more auxiliary turn indicators exemplarily shown as auxiliary turn indicators 26 and 28.

The auxiliary turn indicators 26, 28 may be integrated with the grille 12 or elsewhere located on the vehicle 16. In some embodiments, the auxiliary turn indicators 26, 28 are concealed by the central portion 20 such that they are not visible during periods of nonuse. When activated, light emitted from the auxiliary turn indicators 26, 28 is transmitted through the central portion 20 and becomes visible to vehicle onlookers. In the present embodiment, auxiliary turn indicator 26 is located adjacent end member 14a and may be positioned between end member 14a and headlamp 22. Auxiliary turn indicator 28 is located adjacent end member 14d and may be positioned between end member 14d and headlamp 24.

Figure 2:
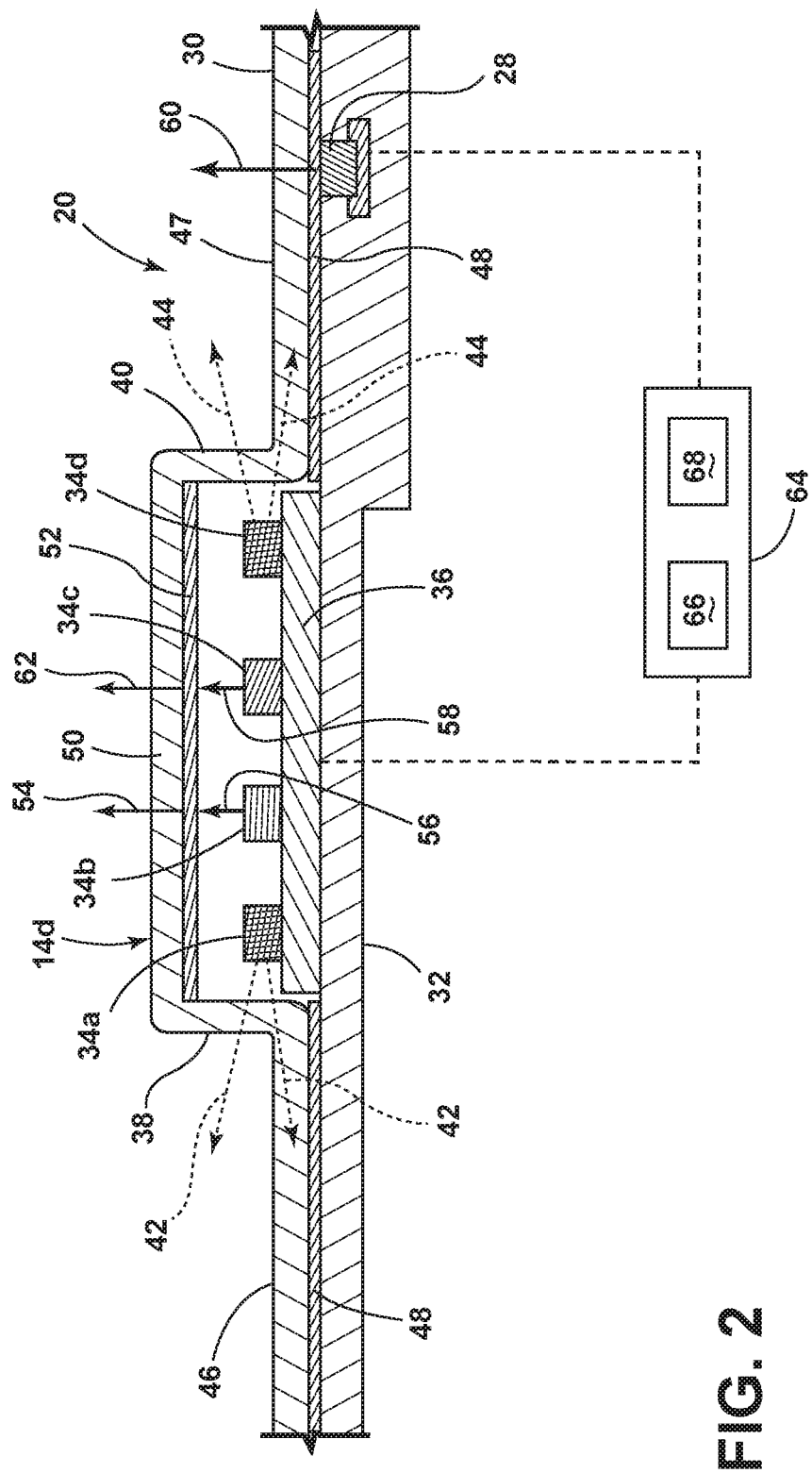
FIG. 2 is a cross-sectional view of the grille taken along line II-II of FIG. 1.

Referring to FIG. 2, a partial cross section of the central portion 20 is shown including end member 14d. While end member 14d will be described in greater detail herein, it will be understood that members 14a-14c may be similarly configured. As shown, the central portion 20 includes a front portion 30 coupled to a rear portion 32. The front and rear portions 30, 32 may be constructed from a molding process whereby the front portion 30 is injection molded from a light transmissive material and the rear portion 32 is insertion molded. Together, the front and rear portions may define member 14d and aid in sealing electronics associated with a plurality of light sources 34a-34d disposed within end member 14d. In the present embodiment, the light sources 34a-34d correspond to light emitting diodes (LEDs) located on a printed circuit board (PCB) 36 that is coupled to the rear portion 32. The PCB 36 may be configured as a flex circuit board and may include a white solder mask to reflect light emitted by one or more of the light sources 34a-34d.

Light sources 34a and 34d are located opposite to one another on the PCB 36 and are configured as side emitters. In operation, the light sources 34a, 34d are disposed to emit light in a sideways direction toward respective sidewalls 38 and 40 of end member 14d. Light emitted from the light sources 34a, 34d is generally represented by arrows 42 and 44, respectively, and is transmitted through the sidewalls 38, 40 to illuminate neighboring areas of the grille 12. At least a portion of the light emitted from the light sources 34a, 34d is directed toward and is transmitted through a corresponding neighboring area 46, 47 of the central portion 20.

In one embodiment, a layer 48 (e.g., reflective paint) is provided between the front and rear portions 30, 32 and is configured to redirect light received from light sources 34a and 34d in a vehicle-forward direction. In another embodiment, the layer 48 may correspond to a light converting layer configured to luminesce in response to light excitation from light sources 34a and 34d. In this embodiment, the layer 48 may convert light excitation from light sources 34a and 34d into light of a shorter or longer wavelength. For example, it is contemplated that light excitation from light sources 34a and 34d may be expressed as white light and is converted by layer 48 into light expressed as a blue color. In another example, the layer 48 may include a long persistence phosphor material (not shown) configured to continue to luminesce for some duration after light excitation ceases to be provided from light sources 34a and 34d. In yet another embodiment, the layer 38 may correspond to a metallized layer formed via partial vacuum metallization, for example, thereby imparting a metallic appearance to the central portion 20.

Referring still to FIG. 2, light sources 34b and 34c are located between light sources 34a and 34d and are disposed to backlight a forward portion 50 of end member 14d. A photoluminescent structure 52 is coupled to end member 14d and is configured to luminesce in a first color in response to light excitation from light source 34b. Additionally, the photoluminescent structure 52 is configured to at least partially transmit light of a second color emitted from light source 34c. In the present embodiment, the photoluminescent structure 52 is coupled to the underside of the forward portion 50 and may luminesce in a red color in response to ultraviolet (UV) light excitation from light source 34b. The photoluminescent structure 52 is also configured to at least partially transmit green light emitted from light source 34c. In such an embodiment, light sources 34b and 34c may correspond to a UV LED and a green LED, respectively.

According to one embodiment, light source 34b is activated to provide UV light excitation to the photoluminescent structure 52. The resultant luminescent light emitted by the photoluminescent structure 52 is transmitted through the forward portion 50 of end member 14d, thereby illuminating the letter formed by end member 14d in the red color. During this time, light sources 34a and 34d may or may not be activated. As discussed herein, operation of light sources 34a and 34d assist with the illumination of neighboring areas of the grille 12 and the resultant illumination can provide an attractive color contrast with the illumination of end member 14d.

Typically, light source 34c is deactivated to prevent green light emitted thereby to mix with the luminescent light emitted by the photoluminescent structure 52. However, in certain instances, light sources 34b and 34c may coordinate to illuminate the letter formed by end member 14d in a different color. For example, light sources 34b and 34c may be operated such that the photoluminescent structure 52 luminesces in the red color and at least partially transmits green light emitted from light source 34c. As a result, the luminescent light mixes with the green light to illuminate the letter formed by end member 14d in an amber color. It is contemplated that the amber colored light is similar to that emitted by auxiliary turn indicators 26 and 28.

With further reference to FIG. 2, auxiliary turn indicator 28 is integrated with the rear portion 32 and is disposed behind layer 48. In embodiments where layer 48 is metallized, auxiliary turn indicator 28 is generally concealed until activation, whereby light emitted from auxiliary turn indicator 28 is transmitted through layer 48 and the front portion 50. It is to be understood that auxiliary turn indicator 26 may be similar configured. For purposes of illustration and understanding, luminescent light emitted from the photoluminescent structure 52 is generally represented by arrow 54 and UV light excitation from light source 34b is generally represented by arrow 56. Light emitted from light source 34c is generally represented by arrow 58 and light emitted by auxiliary turn indicator 28 is generally represented by arrow 60. In instances where luminescent light emitted from the photoluminescent structure 52 mixes with light emitted from light source 34c and transmitted through the photoluminescent structure 52, the resultant light mixture is generally represented by arrow 62.

Figure 3:
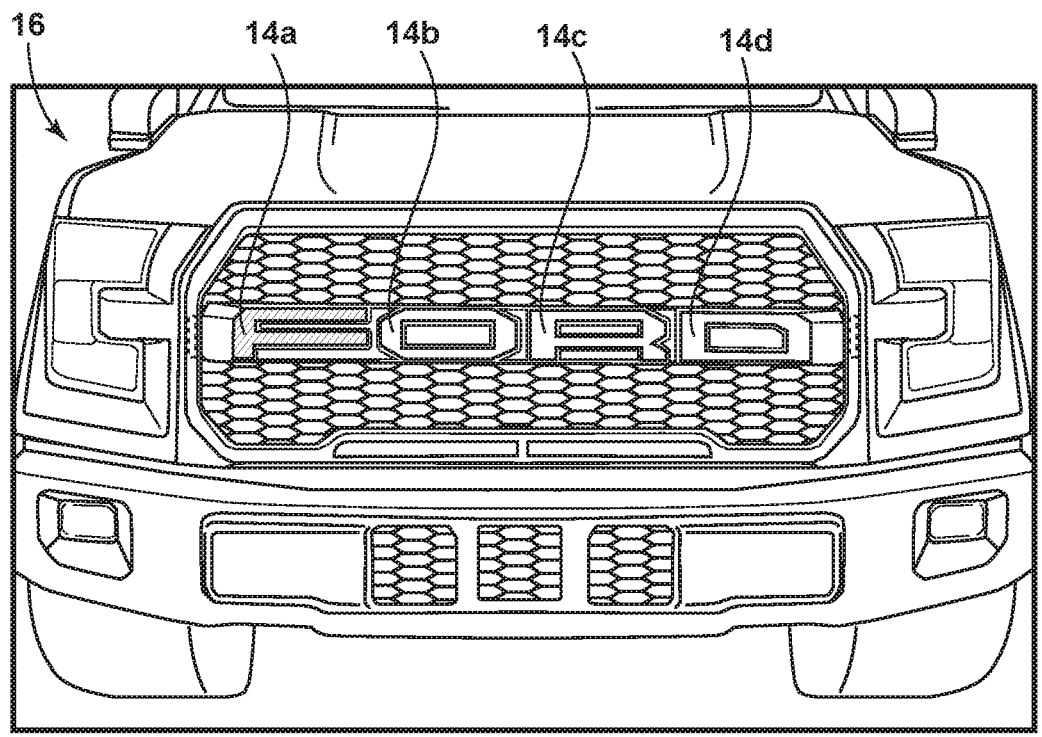
FIGS. 3-6 illustrate a sequential lighting sequence of the grille.
Figure 4:
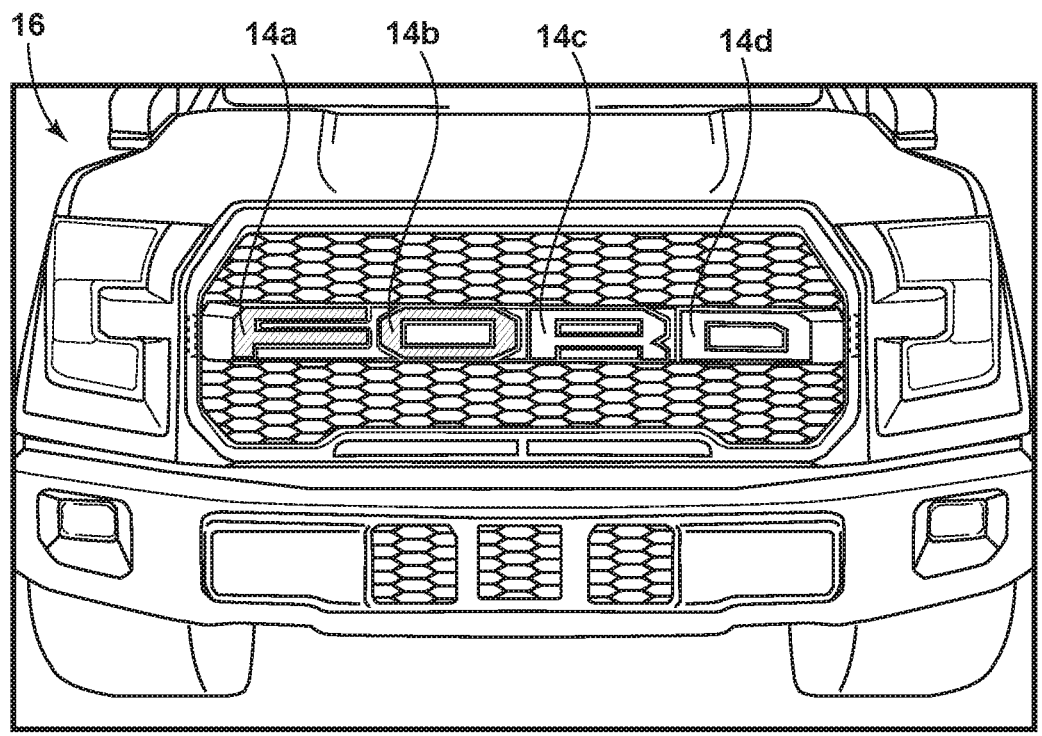
Figure 5:
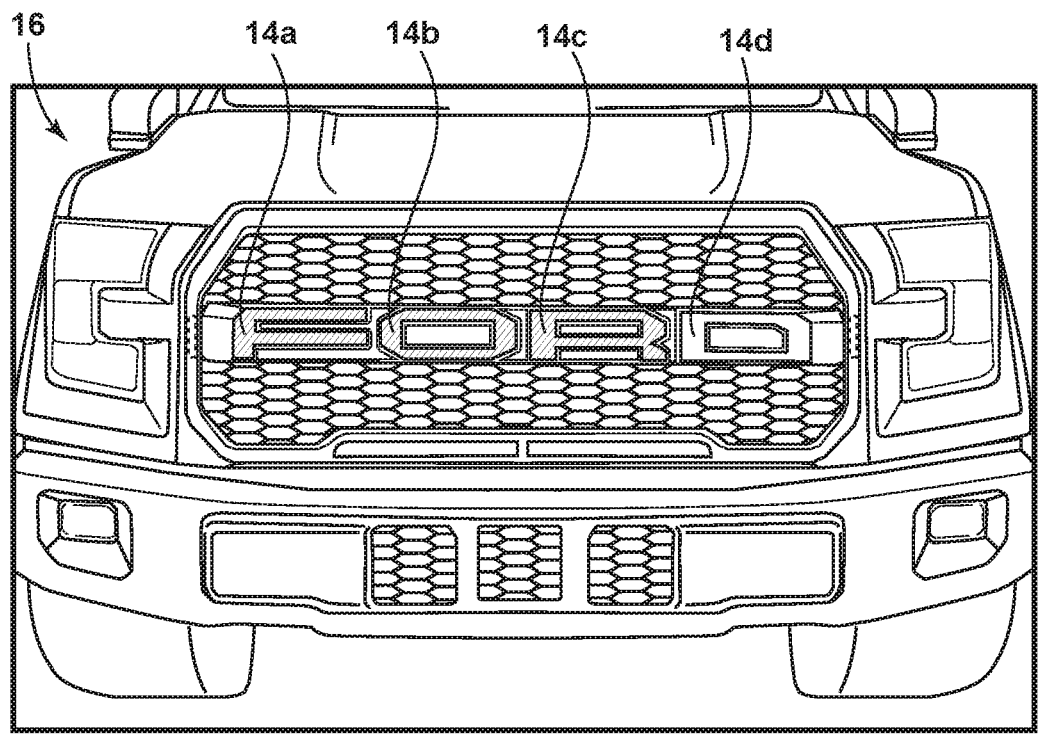
Figure 6:
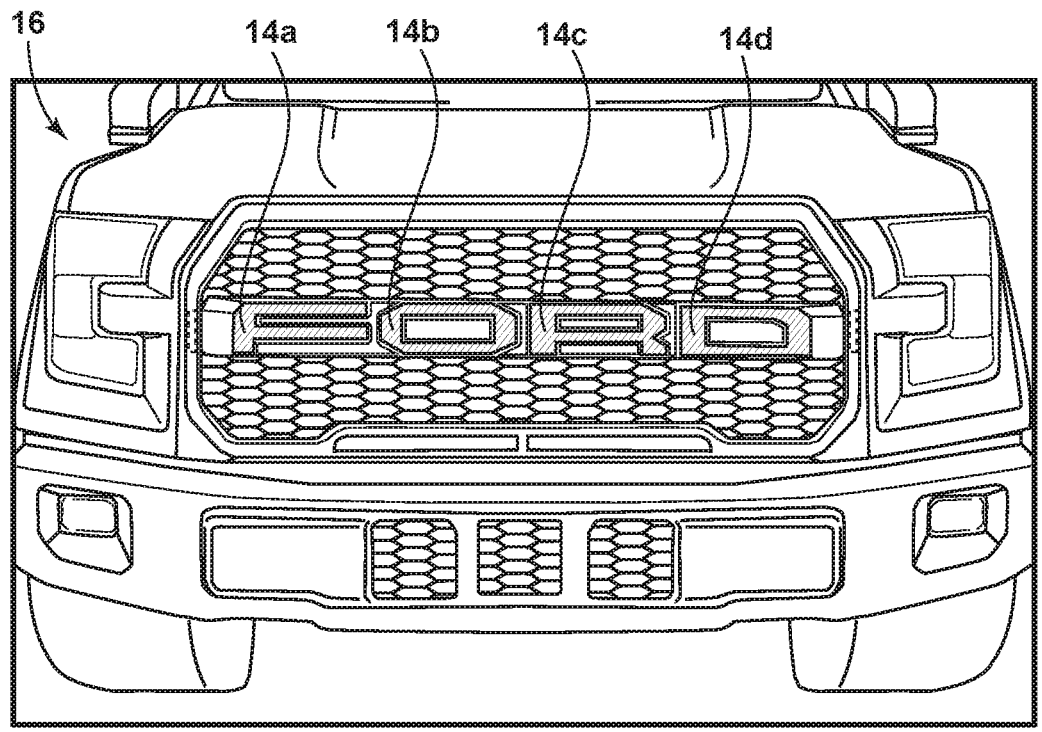

Accordingly, the operation of light sources 34b and 34c may be based on the operation of one or more vehicle light sources such as, but not limited to, auxiliary turn indicators 26 and 28. That is, in instances where the vehicle 16 is engaged in a turn and the auxiliary turn indicators 26 and 28 are triggered, light sources 34b and 34c may be activated such that the letter formed by end member 14d illuminates in the amber color, thereby functioning as a turn indicator. It is contemplated that each of the members 14a-14d may be simultaneously illuminated in the amber color and/or made to blink in conjunction with auxiliary turn indicators 26 and 28. Alternatively, as shown in FIGS. 3-6, members 14a-14d may be sequentially illuminated in the amber color beginning with member 14a and ending with member 14d. As shown in FIG. 3, member 14a is first illuminated in the amber color, followed by member 14b as shown in FIG. 4, member 14c as shown in FIG. 5, and member 14d as shown in FIG. 6. At the end of the sequence, the light sources 34b, 34c of each member 14a-14d may be simultaneously deactivated to cease illumination of each member 14a-14d and the sequence may be started again. Prior to commencement of the sequence, members 14a-14d may or may not already be illuminated in the red color. In instances where members 14a-14d are already illuminated in the red color, the illumination of each member 14a-14d transitions in turn from red to amber.

Referring back to FIG. 2, operation of light sources 34a-34d of each member 14a-14d may be controlled using a controller 64. The controller 64 may include memory 66 having instructions stored thereon that are executable by a processor 68. For example, the processor 68 may execute instructions for operating the light sources 34a-34d of each member 14a-14d to achieve any of the illumination described herein. In operating the light sources 34a-34d of each member 14a-14d, the controller 64 may receive input from one or more vehicle components. For example, in operating the light sources 34a-34d of each member 14a-14d to sequentially illuminate, as described herein, the controller 64 may receive input from auxiliary turn indicators 26 and 28 and respond by activating/deactivating light sources 34b and 34c to achieve the intended effect. While a few illumination schemes have been described herein, it will be appreciated that other illumination schemes are possible through selective activation/deactivation of the light sources 34a-34d of each member 14a-14d. Furthermore, it will be appreciated that the number of light sources 34a-34d are exemplary in nature. That is, each member 14a-14d may house one or more of light source 34a, 34b, 34c, and 34d and the light sources 34a-34d may be variously arranged therein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle grille assembly comprising:
a grille having a rear portion and a front portion defining raised members pointing in a vehicle-forward direction, wherein each raised member includes opposing sidewalls;
a layer disposed between the front and rear portions and disposed adjacent to each of the opposing sidewalls of each raised member;
a photoluminescent structure coupled to each raised member and configured to luminesce in response to excitation light;
a plurality of light sources disposed within each raised member, wherein the plurality of light sources includes a first light source configured to emit ultraviolet light toward the photoluminescent structure and a second light source configured to direct light toward one of the opposing sidewalls; and
one or more auxiliary turn signals integrated within the rear portion, wherein the one or more auxiliary turn indicators is configured to emit light through the layer and the front portion.

2. The vehicle grille assembly of claim 1, wherein each raised member forms a letter.

3. The vehicle grille assembly of claim 1, wherein the raised members are spread across a central portion of the grille, the central portion extending longitudinally across the grille.

4. The vehicle grille assembly of claim 3, wherein the central portion comprises the front portion injection molded from a light transmissive material and the rear portion that is insertion molded.

5. The vehicle grille assembly of claim 1, wherein light emitted from the second light source is transmitted through one of the opposing sidewalls to illuminate neighboring areas of the grille.

6. The vehicle grille assembly of claim 5, wherein the layer is disposed below the neighboring areas of the grille and configured to redirect light received from the second light source in the vehicle-forward direction.

7. The vehicle grille assembly of claim 5, wherein the layer is disposed below the neighboring areas of the grille and configured to luminesce in response light excitation from the second light source.

8. The vehicle grille assembly of claim 5, wherein the layer is a metallized layer disposed below the neighboring areas of the grille and configured to impart a metallic appearance thereto.

9. The vehicle grille assembly of claim 1, further comprising a third light source configured to emit visible light toward the photoluminescent structure, wherein the photoluminescent structure is further configured to at least partially transmit light emitted from the third light source.

10. The vehicle grille assembly of claim 9, further comprising a controller configured to operate the plurality of light sources such that the raised members illuminate sequentially based on input received from the one or more auxiliary turn signals.

11. The vehicle grille assembly of claim 10, wherein the one or more auxiliary turn signals is concealed during nonuse.

12. A grille comprising:
a front portion and a rear portion defining a central portion extending longitudinally between first and second sides of the grille;
a plurality of raised members located on the central portion and pointing in a vehicle-forward direction, wherein each of the plurality of raised members includes:
light sources disposed within the each raised member, wherein the light sources comprise at least one side emitter disposed to emit light through a sidewall of the one of the plurality of raised members, and wherein light emitted from the at least one side emitter is transmitted through the sidewall to illuminate neighboring areas of the grille; and
a photoluminescent structure coupled to each raised member and configured to luminesce in response to light excitation from one or more of the light sources; and
a controller in communication with the light sources, wherein the controller is configured to sequentially illuminate the plurality of raised members from proximate the first side of the grille to proximate the second side of the grille.

13. The grille of claim 12, wherein at least one raised member of the plurality of raised members forms a letter.

14. The grille of claim 12, wherein the photoluminescent structure is further configured to at least partially transmit light emitted from at least one of the light sources.

15. The grille of claim 12, wherein operation of the light sources is based on operation of one or more auxiliary turn signals.

16. A grille comprising:
a rear portion;
a front portion coupled to the rear portion and defining a raised member therebetween on a portion of the grille and pointing in a vehicle-forward direction;
a first light source and a second light source disposed to backlight a forward portion of the raised member;
a first side emitter located within the raised member and disposed to direct emitted light toward a first sidewall of the raised member and a second side emitter located within the raised member and disposed to direct emitted light toward a second sidewall of the raised member;
one or more auxiliary turn signals integrated within the rear portion proximate the raised member and configured to emit light in the vehicle-forward direction through the front portion; and
a photoluminescent structure coupled to the forward portion and configured to luminesce in response to light excitation from the first light source and at least partially transmit light emitted from the second light source.

17. The grille of claim 16, wherein the first and second light sources are operated based on operation of the one or more auxiliary turn signals.

* * * * *